Aug. 8, 1939.                W. S. DAVENPORT                2,169,089
                              CLUTCH MECHANISM
                              Filed May 5, 1937              2 Sheets-Sheet 1
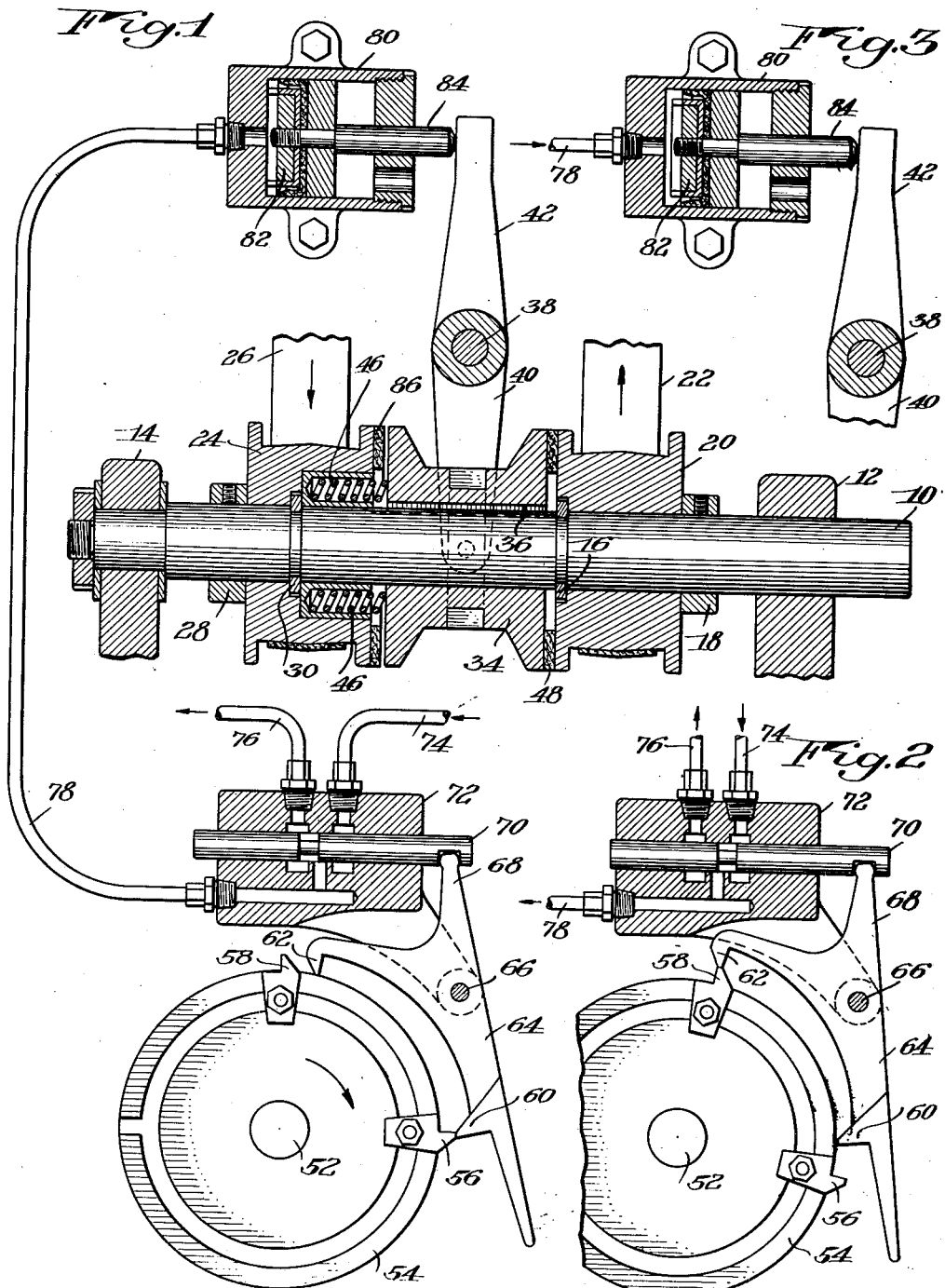
INVENTOR.
William S. Davenport
BY Cumpston & Shepard
his ATTORNEYS

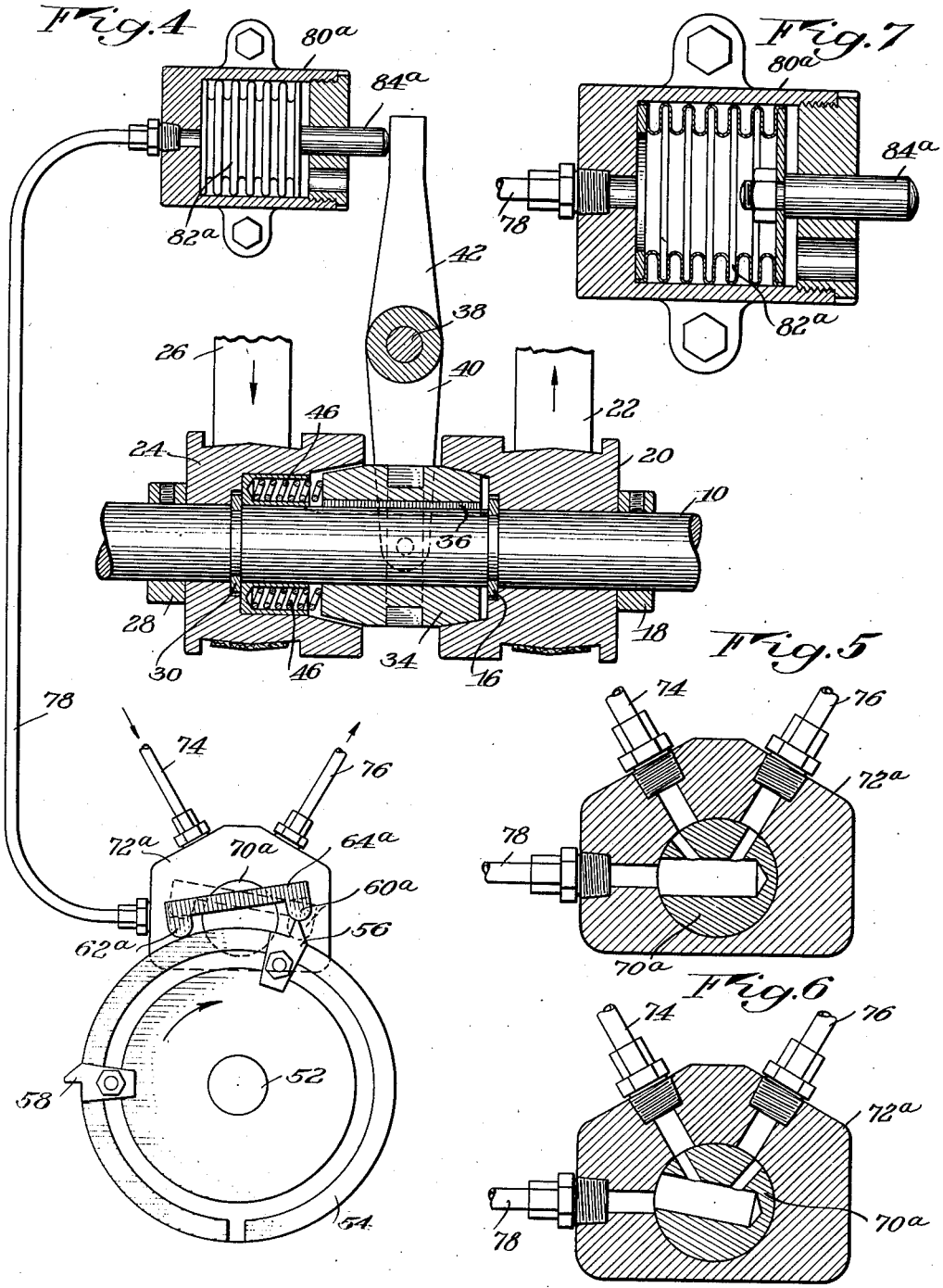

Patented Aug. 8, 1939

2,169,089

UNITED STATES PATENT OFFICE 2,169,089

CLUTCH MECHANISM

William S. Davenport, Rochester, N. Y., assignor to Davenport Machine Tool Co., Inc., Rochester, N. Y., a corporation of New York Application May 5, 1937, Serial No. 140,886

10 Claims. (Cl. 74—220)

This invention relates to a clutch mechanism, and particularly to a clutch for imparting two different motions to a shaft or spindle.

An object of the invention is the provision of a generally improved clutch mechanism of this character which is simple and effective in operation.

Another object is the provision of such a clutch which has few parts, of sturdy construction, easy and comparatively inexpensive to build, and not likely to get out of order.

To these and other ends the invention resides in certain improvements and combinations of parts, all as will be hereinafter more fully described, the novel features being pointed out in the claims at the end of the specification.

In the drawings:

Fig. 1 is a diagrammatic illustration of clutch mechanism in accordance with one embodiment of the invention, illustrating the parts in one position;

Fig. 2 is a view similar to a fragment of Fig. 1, illustrating the control parts in a second position;

Fig. 3 is a view similar to another fragment of Fig. 1, illustrating certain parts in the position which they assume when the control mechanism is in the position of Fig. 2;

Fig. 4 is a view similar to Fig. 1, illustrating a modified form of construction;

Fig. 5 is a detail of the valve mechanism forming part of Fig. 4, in one position;

Fig. 6 is a similar view of the valve mechanism in a second position, and

Fig. 7 is a view similar to a fragment of Fig. 4, illustrating details of the Sylphon bellows.

The same reference numerals throughout the several views indicate the same parts.

Referring now to the embodiment illustrated in Figs. 1 to 3, a shaft to be driven with two different rotary motions is indicated at 10, and is supported in bearings 12 and 14, the latter of which may be a thrust bearing. The shaft 10 may be a tool spindle, or may be geared or otherwise suitably connected to a tool spindle. The two rotary motions to be imparted to the shaft 10 may be rotary motions in the same direction at different speeds, or rotary motions in two opposite directions at the same or different speeds.

Freely rotatable on the shaft 10, between collars 16 and 18, is a pulley 20 driven as by means of a belt 22. A second pulley 24, driven as by means of a belt 26, is also freely rotatable on the shaft 10, and is held between collars 28 and 30. For the sake of illustration, the drawings include arrows on the belts 22 and 26, showing them driven in opposite directions, although as above mentioned both pulleys may be driven in the same direction, at different speeds, depending upon the particular result to be accomplished by the shaft 10.

A clutch body 34 is mounted on the shaft 10 between the pulleys 20 and 24 and is non-rotatably connectetd thereto as by means of the spline 36, so that the clutch member 34 may move longitudinally along the shaft. The member 34 is shifted longitudinally by a shifter pivoted at 38 on a suitable fixed part of the machine, one arm 40 of the shifter engaging the member 34 and the other arm 42 being engaged and moved by mechanism described below.

One or more springs 46 interposed between the pulley 24 and clutch member 34 constantly tend to move the clutch member rightwardly to force the right hand face thereof against an annular friction member 48 mounted on the left hand face of the pulley 20. Preferably a series of coiled springs 46 are employed, spaced uniformly around the shaft 10 and arranged in pockets in the pulley 24, as shown in the drawings. Except when force is applied to the shifter arm 42, the springs 46 hold the clutch member 34 in cooperative engagement with the friction member 48, and the motion of the pulley 20 is thus normally imparted to the shaft 10.

A shaft 52 is rotated constantly at a uniform speed in proper timed sequence to the operations to be performed by the shaft 10. On this shaft 52 is a disk 54 carrying adjustable tappets 56 and 58 offset from each other in different planes perpendicular to the shaft 52, and cooperating respectively with lugs 60 and 62 on a valve shifter 64 pivoted at 66 to a fixed part of the machine. One arm 68 of the valve shifter engages the shank of a piston valve 70 slidable in a valve body 72. A fluid supply line 74 supplies fluid under pressure from any suitable source (such as a pump, or a pressure reservoir) to the valve body. Another fluid line 76 leads from the valve body to a reservoir, when the fluid employed is a liquid such as oil, or to the atmosphere when the fluid employed is compressed air. Another fluid line 78 leads from the valve body to a fluid pressure cylinder 80 containing a piston 82, the piston rod 84 of which acts upon the clutch shifter arm 42.

So long as the valve shifter 64 and valve 70 are in the position shown in Fig. 1, the space in the cylinder 80 to the left of the piston is vented through the line 78 and through the valve 70 and the line 76, so that the fluid pressure cylinder does not press against the shifter arm 42, and thus the springs 46 keep the clutch engaged with the pulley 20 and the shaft 10 is rotated in accordance with the motion of the pulley 20.

When the control shaft 52 turns further around so that the tappet 58 engages the nose 62 of the valve shifter, then the valve 70 is shifted to the position shown in Fig. 2, cutting out the vent line 76 and establishing communication between the fluid supply line 74 and the line 78. Fluid under pressure then flows into the left hand end of the cylinder 80, moving the piston 82 rightwardly to the position shown in Fig. 3. This causes rightward movement of the shifter arm 42, shifting the clutch member 34 leftwardly against the influence of the springs 46, and bringing the left hand face of the clutch member into forcible engagement with the annular friction member 86 on the right hand face of the pulley 24, at the same time releasing the clutch member 34 from the pulley 20. The motion of the pulley 24 is then imparted to the shaft 10, and the shaft continues to rotate with the motion of the pulley 24 until, upon further rotation of the control shaft 52, the tappet 56 moves the valve 70 back to the position shown in Fig. 1, whereupon the fluid pressure within cylinder 80 is released and the clutch is once more disconnected from the pulley 24 and connected to the pulley 20, by the action of the springs 46.

In the alternative construction shown in Figs. 4 to 7, the parts 10 to 46, inclusive, may be substantially the same as in the first embodiment above described, and are indicated by the same reference numerals. One difference in this modified construction is that a clutch of the conical type rather than the annular face type may be employed, the annular friction members 48 and 86 being omitted and the clutch member 34 having conical ends for engaging conical recesses in the pulleys 20 and 24.

As in the previous embodiment, the constantly rotating control shaft 52 carries the disk 54 which has the tappets 56 and 58 for engaging the lugs or noses 60a and 62a of the valve shifter 64a. A difference from the previous embodiment is that the control valve 70a, in this alternative embodiment, is a valve of the rotary type which may be directly connected to the shifter 64a to rotate in the valve body 72a when the shifter is moved. As before, the line for supplying fluid under pressure is indicated at 74, and the vent line at 76. The line 78 connects the valve to the fluid pressure means 80a for operating the clutch shifter 42. In this embodiment, however, instead of a piston within the cylinder 80a, a Sylphon bellows 82a is employed, the rod 84a of which acts upon the shifter arm 42.

The operation of this alternative construction is substantially the same as that previously described. So long as the valve shifter and valve are in the position shown in Figs. 4 and 5, the line 78 is vented to the line 76, and the springs 48 hold the clutch in engagement with the pulley 20, in what may be termed the normal position of the clutch, so that the motion of the pulley 20 is transmitted to the shaft 10. When the control shaft 52 rotates so that the tappet 58 moves the valve to the other position shown in Fig. 6, then the fluid flows from the supply line 74 through the valve and the line 78 to the Sylphon bellows, shifting the bellows rightwardly, and moving the clutch member 34 to disengage it from the pulley 20 and engage it with the pulley 24, so that the motion of the pulley 24 is then transmitted to the shaft 10.

It will be noted that in both forms of construction, when the clutch is in its normal position engaged with the pulley 20, there is no end thrust whatever on the shaft 10. Only when the clutch is shifted into engagement with the pulley 24 is there any end thrust on the shaft, and this is taken up by the thrust bearing 14.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. Clutch mechanism of the type including a shaft, two driven elements rotatable on said shaft, and a clutch member on said shaft, characterized by resilient means arranged about said shaft and normally tending to hold said member in operative engagement with one of said elements, and fluid pressure means for shifting said member out of operative engagement with said one of said elements and into operative engagement with the other of said elements.

2. Clutch mechanism of the type including a shaft, two pulleys rotatably mounted thereon, and a clutch member slidably and non-rotatably mounted on said shaft between said pulleys, characterized by spring means arranged about said shaft and normally holding said member in operative engagement with one of said pulleys, and fluid pressure means for shifting said member into engagement with the other of said pulleys.

3. Clutch mechanism of the type including a shaft, two driven elements rotatably mounted thereon and held against longitudinal movement thereon, and a clutch member non-rotatably mounted on said shaft between said two elements and capable of longitudinal movement on said shaft, characterized by spring means interposed between said member and one of said elements and normally holding said member in operative engagement with the other of said elements without producing end thrust on said shaft, and fluid pressure means for moving said member along said shaft against the action of said spring means to shift said member out of operative engagement with said other element and into operative engagement with said one element.

4. A construction according to claim 3, in which said spring means includes a plurality of coiled springs grouped around said shaft and arranged at least partially within pockets in said one of said elements.

5. Clutch mechanism of the type including a shaft, two pulleys rotatably mounted thereon in spaced relation to each other, and a clutch member longitudinally slidable on said shaft between said pulleys and non-rotatably connected to said shaft, characterized by spring means interposed between said member and one of said pulleys to tend to hold said member in driving relation to the other pulley, and fluid pressure means for shifting said member against the action of said spring means out of driving relation to said other pulley and into driving relation to the first pulley.

6. Clutch mechanism of the type including a shaft, two differentially rotatable elements rotatably mounted on said shaft, a clutch member on said shaft, spring means tending to hold said member in operative engagement with one of said elements, and a constantly rotating control shaft, characterized by fluid valve means operated by said control shaft, and fluid pressure means controlled by said valve means for shifting said member into operative engagement with the other of said elements and out of operative engagement with said one of said elements.

7. Clutch mechanism of the type including a shaft, two differentially rotatable elements rotatably mounted on said shaft, a clutch member on said shaft, a clutch shifter including an arm, and a control shaft constantly rotating at substantially uniform speed, characterized by spring means tending to hold said clutch member in operative engagement with one of said rotatable elements, fluid pressure means for acting upon said arm to shift said clutch member against the force of said spring means, and fluid valve means operated by said control shaft at one point in its revolution to operate said fluid pressure means to act upon said arm to shift said clutch member out of operative engagement with said one of said elements and into operative engagement with the other of said elements, said valve means being operated at another point in the revolution of said control shaft to release said fluid pressure means so that said spring means will shift said clutch member back out of operative engagement with said other of said elements and into operative engagement with said one of said elements.

8. Clutch mechanism for a shaft adapted to be driven at a normal speed and another speed or in one normal rotational direction and in the opposite direction and wherein a pair of driving members are rotatably mounted on the shaft, said clutch mechanism comprising a driving clutch element operatively associated with each of said driving members, a driven clutch element mounted on and rotatable with said shaft and movable along said shaft into and out of engagement with either of said driving clutch elements, resilient means operatively connected to the shaft and normally urging said driven clutch element in a direction such that the driven clutch element is retained out of engagement with one of said driving clutch elements and in engagement with the other driving clutch element, the thrust of said resilient means being exerted in one direction along the shaft and the operative connection of said resilient means to said shaft causing said resilient means to exert a balancing thrust on the shaft in the opposite direction of such nature that under normal conditions of operation the shaft is relieved of end thrust, and means for shifting said driven clutch element against the action of said resilient means into engagement with said one of said driving clutch elements and out of engagement with said other of said driving clutch elements.

9. Clutch mechanism of the type including a shaft, two driven elements rotatable on said shaft and a clutch member on said shaft, characterized by resilient means arranged about said shaft and normally tending to hold said member in operative engagement with one of said elements and fluid pressure means for shifting said member out of operative engagement with said one of said elements and into operative engagement with the other of said elements against the action of said resilient means, said fluid pressure means being normally relieved of pressure when said resilient means is effective to hold said clutch member in engagement with said one of said elements and being under fluid pressure only when the clutch member is moved against the action of said resilient means to engage the clutch member with said other element.

10. Clutch mechanism of the type including a shaft, two driven elements rotatably mounted thereon and held against longitudinal movement thereon, and a clutch member non-rotatably mounted on said shaft between said two elements and capable of longitudinal movement on said shaft, characterized by spring means interposed between said clutch member and one of said elements and normally holding said clutch member in operative engagement with the other of said elements, said spring means exerting a thrust on the shaft in one direction through said clutch member and said other element and exerting an equal thrust on the shaft in the opposite direction of such nature that end thrust on the shaft is avoided when the spring means is effective and fluid pressure means for moving said member along said shaft against the action of said spring means to shift said member out of operative engagement with said other element and into operative engagement with said one element, said fluid pressure means being normally relieved of pressure when said spring means is effective to hold said clutch member in engagement with said other element and being under fluid pressure only when the clutch member is moved against the action of said spring means to engage the clutch member with said one element.

WILLIAM S. DAVENPORT.